(12) United States Patent
Sakuma et al.

(10) Patent No.: US 8,493,175 B2
(45) Date of Patent: Jul. 23, 2013

(54) VEHICLE AUTHENTICATION CONTROL DEVICE

(75) Inventors: Takahiro Sakuma, Kasugai (JP); Tomoko Onoda, Kasugai (JP)

(73) Assignee: OMRON Corporation, Kyoto (JP)

( * ) Notice: Subject to any disclaimer, the term of this patent is extended or adjusted under 35 U.S.C. 154(b) by 409 days.

(21) Appl. No.: 12/613,298

(22) Filed: Nov. 5, 2009

(65) Prior Publication Data

US 2010/0109836 A1 May 6, 2010

(30) Foreign Application Priority Data

Nov. 6, 2008 (JP) ................................ 2008-284975

(51) Int. Cl.
| | |
|---|---|
| *G05B 19/00* | (2006.01) |
| *G05B 23/00* | (2006.01) |
| *B60R 25/10* | (2006.01) |
| *G06F 7/00* | (2006.01) |
| *H01H 47/00* | (2006.01) |
| *F02D 29/06* | (2006.01) |

(52) U.S. Cl.
USPC ....... 340/5.61; 340/5.8; 340/5.2; 340/426.19; 340/5.7; 340/5.62; 340/5.72; 307/10.5; 290/40 C

(58) Field of Classification Search
USPC ............... 340/825.69, 825.31, 825.72, 425.5, 340/426, 539, 991, 825.32, 10.5, 5.61, 5.72, 340/426.16, 901, 902, 903, 904, 988, 989, 340/500, 426.6, 436, 565, 545.3, 552, 438–439, 340/5.8, 426.19, 5.7, 5.62; 701/70, 300, 93, 701/96, 41, 301; 307/9.1, 10.1, 10.5, 10.2, 307/10.3, 10.4, 10.6
See application file for complete search history.

(56) References Cited

U.S. PATENT DOCUMENTS 6,225,890 B1 * 5/2001 Murphy .................. 340/426.19

6,876,292 B2 * 4/2005 Onuma et al. ............... 340/5.62
(Continued)

FOREIGN PATENT DOCUMENTS

| JP | 2005-076263 A | 3/2005 |
| JP | 2006306290 A | 11/2006 |
| JP | 2007153259 A | 6/2007 |

OTHER PUBLICATIONS

Office Action Issued in Japanese Application No. 2008-284975, Dated Aug. 2, 2012 (4 Pages With English Translation).

(Continued)

*Primary Examiner* — Jennifer Mehmood
*Assistant Examiner* — Mirza Alam
(74) *Attorney, Agent, or Firm* — Osha Liang LLP

(57) ABSTRACT

A vehicle authentication control device has a first, second, and third determination units, and a registration unit. When identification information unique to a vehicle is registered in both a portable device and an authentication device on the vehicle, the first determination unit matches first identification information returned from the portable device in response to a request from the authentication device and second identification information registered in the authentication device to determine whether a combination of the portable device and the authentication device is legitimate. When third identification information is registered in a part different from the authentication device, the part performing a predetermined operation when the first determination unit is legitimate, the second determination unit matches the third identification information registered in the part and the second identification information registered in the authentication device to determine whether a combination of the part and the authentication device is legitimate. The second determination unit determines that the part is a non-used article if the third identification information is not registered in the part. If the determination results of the first determination unit and the second determination unit are both positive, then the third determination unit determines that a combination of the part, the portable device, and the authentication device is legitimate. If the second determination unit determines that the part is a non-used vehicle, the registration unit registers the second identification information registered in the authentication device as third identification information.

2 Claims, 2 Drawing Sheets

U.S. PATENT DOCUMENTS

| | | | |
|---|---|---|---|
| 6,900,552 B2* | 5/2005 | Fukano et al. | 290/40 C |
| 7,161,467 B2* | 1/2007 | Takahashi et al. | 340/5.7 |
| 2004/0257267 A1* | 12/2004 | Mafune et al. | 342/107 |
| 2005/0073197 A1* | 4/2005 | Matsubara et al. | 307/10.5 |
| 2005/0132765 A1* | 6/2005 | Nagae et al. | 70/252 |
| 2006/0192650 A1* | 8/2006 | Shinada | 340/5.2 |
| 2006/0208856 A1* | 9/2006 | Nakashima et al. | 340/5.72 |
| 2010/0097175 A1* | 4/2010 | Kasai et al. | 340/5.8 |

OTHER PUBLICATIONS

Patent Abstracts of Japan, Publication No. 2006-306290, Publication Date: Nov. 9, 2006 (1 Page).

Patent Abstracts of Japan, Publication No. 2007-153259, Publication Date: Jun. 21, 2007 (1 Page).

* cited by examiner

VEHICLE AUTHENTICATION CONTROL DEVICE

BACKGROUND OF THE INVENTION

1. Technical Field

The present invention relates to a vehicle authentication device for performing authentication on whether or not a driver is a legitimate driver (possessor of vehicle etc.) between a vehicle and a carrying portable device when starting the drive of the vehicle.

2. Related Art

A vehicle authentication control device aiming to prevent theft of vehicle and illegal use is being used. The vehicle authentication control device exchanges unique identification information (hereinafter referred to as an ID) assigned to each vehicle through a wireless communication that uses a weak radio wave between an authentication device mounted on the vehicle and a portable device to determine whether a legitimate driver, and permits the startup of the engine and also unlocks a steering lock when determined as the legitimate driver (see e.g., Japanese Unexamined Patent Publication No. 2005-76263).

In the above vehicle authentication control device, the ID unique to the vehicle is stored in both the authentication device mounted on the vehicle and the portable device, and such an ID are matched to determine whether or not the legitimate driver, but the possibility the authentication device mounted on the vehicle might be illegally changed cannot be denied, and hence the security is vulnerable in this respect.

The measures for the above drawback, that is, illegal changing of the authentication device are believed to be taken by storing a storage area of the ID on the vehicle side not only in the authentication device, but also in parts such as an engine control unit for performing engine control and a steering lock unit for controlling the lock/unlock of the steering wheel based on the authentication result from the authentication device.

In other words, conventionally, the lock/unlock of the steering wheel has been performed with a mechanical key, but some kind of security measures became necessary for the steering lock unit with the appearance of recent electronic keys (key type not using mechanical key).

In the vehicle system of the electronic key type, since a unit (BCM) for performing the authentication with the portable device is arranged, redundantly loading the same wireless authentication function into the steering lock unit leads to increase in cost.

Therefore, the wireless authentication function is not loaded into the steering lock unit, and the authentication result performed by the BCM is transmitted to the steering lock unit via harness.

However, if the authentication result is flowed to the harness as simple data, a third person with bad intention may easily steal such data and imitate the data. There is thus a concern that the lock may be unlocked by providing the imitated data to the steering lock unit.

To eliminate such a concern, the BCM and the steering lock unit transmit the authentication result of the portable device using an encrypted signal, and the ID and the encryption are adopted to also verify the legitimacy of the BCM and the steering lock unit.

SUMMARY

Although the vulnerability of security can be avoided by also registering the ID in the steering lock unit, as described above, a task of re-registering the ID arises if the steering lock unit fails to operate properly and the relevant unit is (legitimately) changed.

One or more embodiments of the present invention provides a vehicle authentication control device in which the ID registration task of a case where the part (preferably steering lock unit) is changed is simplified.

In accordance with a first aspect of the present invention, there is provided a vehicle authentication control device including a first determination unit for, when identification information unique to a vehicle is registered in both a portable device and an authentication device on the vehicle side, matching first identification information returned from the portable device in response to a request from the authentication device and second identification information registered in the authentication device to determine whether or not a combination of the portable device and the authentication device is legitimate; the vehicle authentication control device including: a second determination unit for, when third identification information is registered in a part different from the authentication device, the part performing a predetermined operation when the first determination unit is legitimate, matching the third identification information registered in the part and the second identification information registered in the authentication device to determine whether or not a combination of the part and the authentication device is legitimate and determine that the part is a non-used article if the third identification information is not registered in the part; a third determination unit for determining that a combination of the part, the portable device, and the authentication device is legitimate if the determination results of the first determination unit and the second determination unit are both positive; and a registration unit for registering the second identification information registered in the authentication device as third identification information if determined by the second determination unit that the part is a non-used article.

A second aspect of the present invention provides the vehicle authentication control device according to the first aspect, wherein the part returns specific information indicating to be a non-used article instead of the third identification information when the part is a non-used article.

A third aspect of the present invention provides the vehicle authentication control device according to the first or second aspect, wherein the part is a steering lock unit.

A vehicle authentication control device is provided in which the registration task of the identification information (ID) of the case where the part is changed is simplified, where the identification information is also registered in a part different from the authentication device, and the identification information registered in the part and the identification information registered in the authentication device are matched to determine whether or not the combination of the part and the authentication device is legitimate, and the identification information registered in the authentication device is registered in the part if the part is a non-used article.

DETAILED DESCRIPTION

Hereinafter, preferred embodiments of the present invention will be described with reference to the drawings. In embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention.

Figure 1:
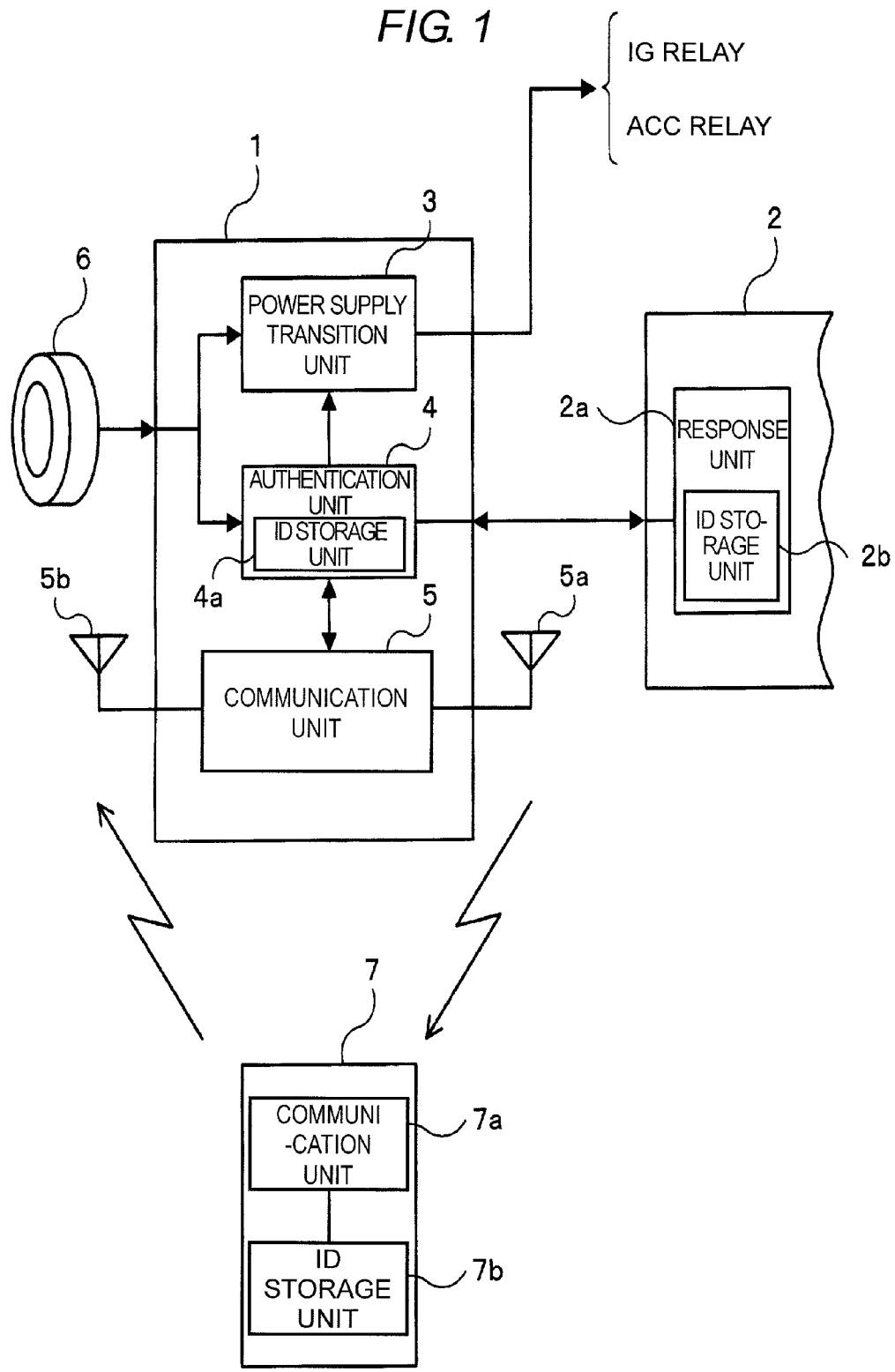
FIG. 1 is a system conceptual view according to an embodiment.

FIG. 1 is a system conceptual view according to an embodiment. In the figure, a BCM 1 (Body Control Module: module mainly controlling electrical components in a vehicle compartment) and a steering lock unit 2 are both mounted on a vehicle, and a portable device 7 is carried by a legitimate driver (possessor etc.) of the vehicle. The portable device 7 is also sometimes referred to as a remote controller. A vehicle authentication control device is mainly configured by such three elements (BCM 1, steering lock unit 2, and portable device 7).

The BCM 1 includes a power supply transition unit 3, an authentication unit 4, and a communication unit 5, where the power supply transition unit 3 generates an operation signal of an IG relay or an ACC relay, for example in response to a startup signal from a power supply transition startup switch (push switch 6 by way of example) operated by a passenger (not shown) and an authentication signal from the authentication unit 4, and outputs the operation signal to the relays. The authentication unit 4 performs authentication (hereinafter referred to as portable device authentication) with the portable device (hereinafter also referred to as a remote controller) 7 carried by the passenger through the communication unit 5, and also performs authentication (hereinafter referred to as steering lock unit authentication) with the steering lock unit 2, and permits the power transition control in the power supply transition unit 3 and permits the steering unlock control in the steering lock unit 2 when the two authentication results are both "success". Here, the authentication result "success" means the following. The success in the case of the portable device authentication means that the combination of the portable device 7 and the authentication unit 4 is legitimate, and the success in the steering lock unit authentication means that the combination of the steering lock unit 2 and the authentication unit 4 is legitimate. Therefore, if the two authentication results are both success, this means that three combinations of the portable device 7, the steering lock unit 2, and the authentication unit 4 are legitimate.

The communication unit 5 includes a transmitter (not shown) and a transmission antenna 5a thereof for transmission at a weak radio of LF band, and a receiver (not shown) and a reception antenna 5b thereof for reception at a weak radio of UHF band, and performs request of information (ID) necessary for the authentication and reception of the information thereof with a communication unit 7a of the portable device 7.

The steering lock unit 2 includes a control unit 2a and a steering lock mechanism (not shown), and locks or unlocks the steering wheel in response to a control signal from the BCM 1 and also returns the ID registered in advance to the BCM 1 in response to a request signal from the BCM 1, and performs the operation of registering the ID according to the ID information notified from the BCM 1 when the ID is not registered (e.g., in the case of non-used steering lock unit 2 legitimately changed due to failure and the like), as a function specific to the present embodiment.

The authentication unit 4 of the BCM 1, and the portable device 7 and the control unit 2a of the steering lock unit 2 respectively store matching information (ID) for authentication. ID storage units 4a, 2b, 7b in the figure are storage elements therefor. The matching information (ID) stored in the ID storage unit 7b corresponds to first identification information described in the summary of the invention, the matching information (ID) stored in the ID storage unit 4a corresponds to second identification information described in the summary of the invention, and the matching information (ID) stored in the ID storage unit 2b corresponds to third identification information described in the summary of the invention. The matching information (first to third matching information) stored in the ID storage units 4a, 2b, 7b may be the same, or may be different information where all or some information have some kind of relevance.

In such a configuration, when the push switch 6 is operated, the portable device authentication is performed in the authentication unit 4 of the BCM 1. The portable device authentication is carried out by emitting an inquiry signal to the portable device 7 through the communication unit 5, receiving an ID (stored in ID storage unit 7b: first identification information) contained in the response signal from the portable device 7 through the communication unit 5, and determining matching/non-matching with the ID (second identification information) stored in advance in the ID storage unit 4a of the authentication unit 4. If the IDs match, determination is made as a response from the legitimate portable device 7, and the next steering lock unit authentication is performed.

The steering lock unit authentication is carried out by emitting an inquiry signal to the steering lock unit 2, determining matching/non-matching of an ID (stored in ID storage unit 2b: third identification information) contained in the response signal from the steering lock unit 2 and the ID (second identification information) stored in advance in the ID storage unit 4a of the authentication unit 4. If the IDs match, determination is made as a response from the legitimate steering lock unit 2, and thereby permits the power supply transition control in the power supply transition unit 3 and permits the steering unlock control in the steering lock unit 2.

In the steering lock unit authentication, when the steering lock unit 2 is changed, the ID storage unit 2b is in an empty non-registered state (or state in which specific initial value is written) if the steering lock unit 2 is a "non-used article", and thus the response signal from such a steering lock unit 2 does not contain the ID (third identification information). The signal state not containing the ID represents that the steering lock unit 2 is a "non-used article". Here, a "non-used article" means, for example, a product shipped from a factory to be changed with a defected article in the market.

The important point in the present embodiment is to, when performing the steering lock unit authentication in the authentication unit 4, perform a series of operations of determining that change is made to a non-used steering lock unit 2 if the ID (third identification information) is not contained in the response signal from the steering lock unit 2, sending the ID (second identification information) written in the ID storage unit 4a of the authentication unit 4 to the control unit 2a of the steering lock unit 2, and registering the ID (second identification information) thereof from the control unit 2a to the ID storage unit 2b. The name of the second identification information registered in the ID storage unit 2b thereafter changes to third identification information.

Therefore, if the steering lock unit 2 is changed to a non-used article, the ID can be registered in the ID storage unit 2b of the steering lock unit 2 thereafter by simply operating the push switch 6, thereby consequently simplifying the ID registration task and improving the maintainability.

Figure 2:
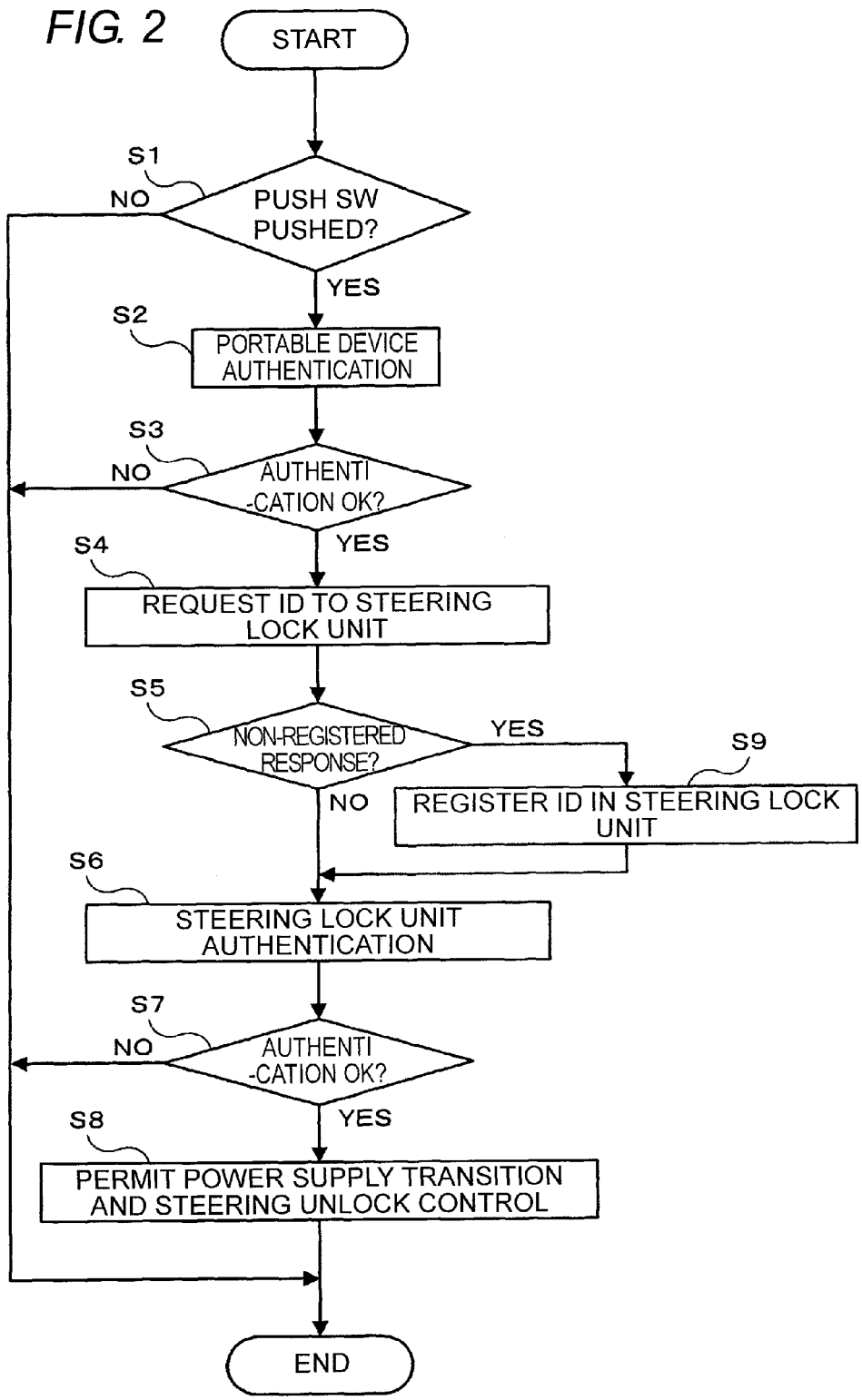
FIG. 2 is a view showing a flow of an authentication operation in the present embodiment.

FIG. 2 is a view showing a flow of an authentication operation in the present embodiment. This flow is periodically executed in the authentication unit 4 of the BCM 1. In this flow, the push-down operation of the push switch 6 is first determined (step S1). The flow is terminated if the push-down operation is not determined, and the portable device authentication is performed (step S2) if the push-down operation is determined. In the portable device authentication, the inquiry signal is emitted to the portable device 7 through the communication unit 5, the ID (stored in the ID storage unit 7b: first identification information) contained in the response signal from the portable device 7 is received through the communication unit 5, and the matching/non-matching with the ID (second identification information) stored in advance in the ID storage unit 4a of the authentication unit 4 is determined. Determination is made as the response from a legitimate portable device 7 if the IDs match (step S3).

Determination is made as a response from another portable device and the flow is terminated if the result of the portable device authentication is NO, whereas the ID (third identification information) requested to the steering lock unit 2 (step S4) if the result of the portable device authentication is YES. Whether or not the response signal from the steering lock unit 2 is "non-registered response" is determined (step S5). The non-registered response is a state in which the ID storage unit 2b of the steering lock unit 2 is empty (or state in which special initial value is written), and refers to a response in which the ID (third identification information) is not contained in the response signal from the steering lock unit 2. In other words, the non-registered response is the response in the case where the steering lock unit 2 is a non-used article.

The steering lock unit authentication is performed (step S6) if the determination result of step S5 is NO, that is, if not determined as the non-registered response, whereas the steering lock unit authentication is performed (step S6) after reading out the ID (second identification information) from the ID storage unit 4a of the authentication unit 4, sending such an ID (second identification information) to the control unit 2a of the steering lock unit 2 and registering the same as the third identification information in the ID storage unit 2b of the control unit 2a (step S9) if the determination result of step S5 is YES, that is, if determined as the non-registered response.

In the steering lock unit authentication, the inquiry signal is issued to the steering lock unit 2, and the matching/non-matching of the ID (stored in ID storage unit 2b: third identification information) contained in the response signal from the steering lock unit 2 and the ID (second identification information) stored in advance in the ID storage unit 4a of the authentication unit 4 is determined (step S7). If the IDs match, determination is made as a response from the legitimate steering lock unit 2, and the power supply transition control in the power supply transition unit 3 is permitted and the steering unlock control in the steering lock unit 2 is permitted (step S8).

According to the configurations and the operations above, the present embodiment has the following effects.

(1) Portable Device Authentication

Since the matching/non-matching of the ID (first identification information) stored in the ID storage unit 7b of the portable device 7 and the ID (second identification information) stored in the ID storage unit 4a of the authentication unit 4 are determined to determine whether or not a response from a legitimate portable device 7, the response from other portable devices and illegally converted portable devices can be excluded, and the security can be ensured.

(2) Steering Lock Unit Authentication

Since the matching/non-matching of the ID (third identification information) stored in the ID storage unit 2b of the steering lock unit and the ID (second identification information) stored in the ID storage unit 4a of the authentication unit 4 are determined to determine whether or not a response from a legitimate steering lock unit, the response from illegally converted steering lock units can be excluded, and the security can be ensured in cooperation with the portable device authentication.

(3) ID Registration to Steering Lock Unit

When changed to the non-used steering lock unit 2, the steering lock unit authentication is performed (step S6) after determined as "non-registered response" in step S5, and the ID (third identification information) is registered in the ID storage unit 2b of the non-used steering lock unit 2 in step S9, whereby the ID registration task after the change is simplified and the maintainability is improved.

(4) Perform Authentication with Part Difficult to Change

The steering lock unit 2 is a unit externally attached to the steering shaft, and thus the steering shaft needs to be detached to change the unit. Thus, considerable trouble and time are required for the change, so that the risk of being illegally changed by a third person having bad intentions can be lowered. Therefore, the security can be further enhanced by performing the authentication with the "part difficult to change".

The above description merely illustrates one example of the technical idea of the present invention, and it should be recognized that various variants and developments, such as described below, can be encompassed within the scope of such an idea.

For instance, the same ID (first identification information=second identification information=third identification information) are registered in the BCM 1, the portable device 7, and the steering lock unit 2 in the above description, but this is not the sole case, and the first ID may be registered in the portable device 7, the second ID different from the first ID may be registered in the steering lock unit 2, and the two IDs (first ID and second ID) may be registered in the BCM 1. In this case, the authentication unit 4 of the BCM 1 performs matching of the first ID when performing the portable device authentication, and performs the matching of the second ID when performing the steering lock unit authentication.

Furthermore, the raw ID is exchanged as is between the BCM 1 and the portable device 7, as well as between the BCM 1 and the steering lock unit 2 in the above description, but this is not the sole case, and the encrypted ID, or transfer ID created according to a predetermined rule from the raw ID may be exchanged. This is preferable as measures can be taken for interception (surreptitious reading) of the ID in the middle of transferring, and the security can be further enhanced.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A vehicle authentication control device comprising:
a transmission antenna which emits an inquiry signal to a portable device;
a reception antenna which receives first identification information returned from the portable device in response to the inquiry signal;
a first ID storage unit configured to register second identification information unique to a vehicle;
a first determination unit which performs an authentication with the portable device;

a second determination unit which performs an authentication with a steering lock unit provided in the vehicle and connected to the vehicle authentication control device;
a third determination unit; and
a registration unit;
wherein the steering lock unit comprises a second ID storage unit configured to store third identification information unique to the vehicle,
wherein the first determination unit matches the first identification information received by the reception antenna and the second identification information registered in the first ID storage unit to determine whether a combination of the portable device and the first determination unit is legitimate,
wherein, if the third identification information is registered in the second ID storage unit of the steering lock unit, the second determination unit matches the third identification information registered in the second ID storage unit of the steering lock unit and the second identification information registered in the first ID storage unit to determine whether a combination of the steering lock unit and the second determination unit is legitimate,
wherein, if the third identification information is not registered in the second ID storage unit when the second determination unit performs authentication with the steering lock unit, the second determination unit determines that the steering lock unit is a non-used article;
wherein, if the determination results of the first determination unit and the second determination unit are both positive, then the third determination unit determines that a combination of the steering lock unit, the portable device, the first determination unit, and the second determination unit is legitimate, and
wherein, if the second determination unit determines that the steering lock unit is the non-used article, the registration unit registers the second identification information registered in the first ID storage unit as the third identification information in the second ID storage unit.

2. The vehicle authentication control device according to claim 1, further comprising:
a power supply transition startup switch which is operated by a passenger; and
a power supply transition unit which generates an operation signal of an IG relay or an ACC relay in response to a startup signal from the power supply transition startup switch and an authentication signal from the third determination unit,
wherein the first determination unit starts to perform the authentication with the portable device, and
wherein the second determination unit starts to perform the authentication with the steering lock unit.

* * * * *